Sept. 18, 1934.    E. G. BAILEY    1,973,697
HIGH TEMPERATURE INCINERATOR FURNACE
Filed Oct. 15, 1932
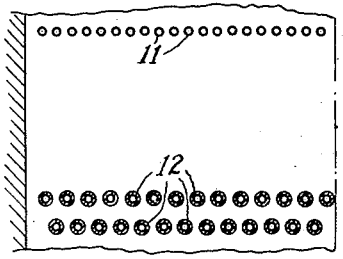
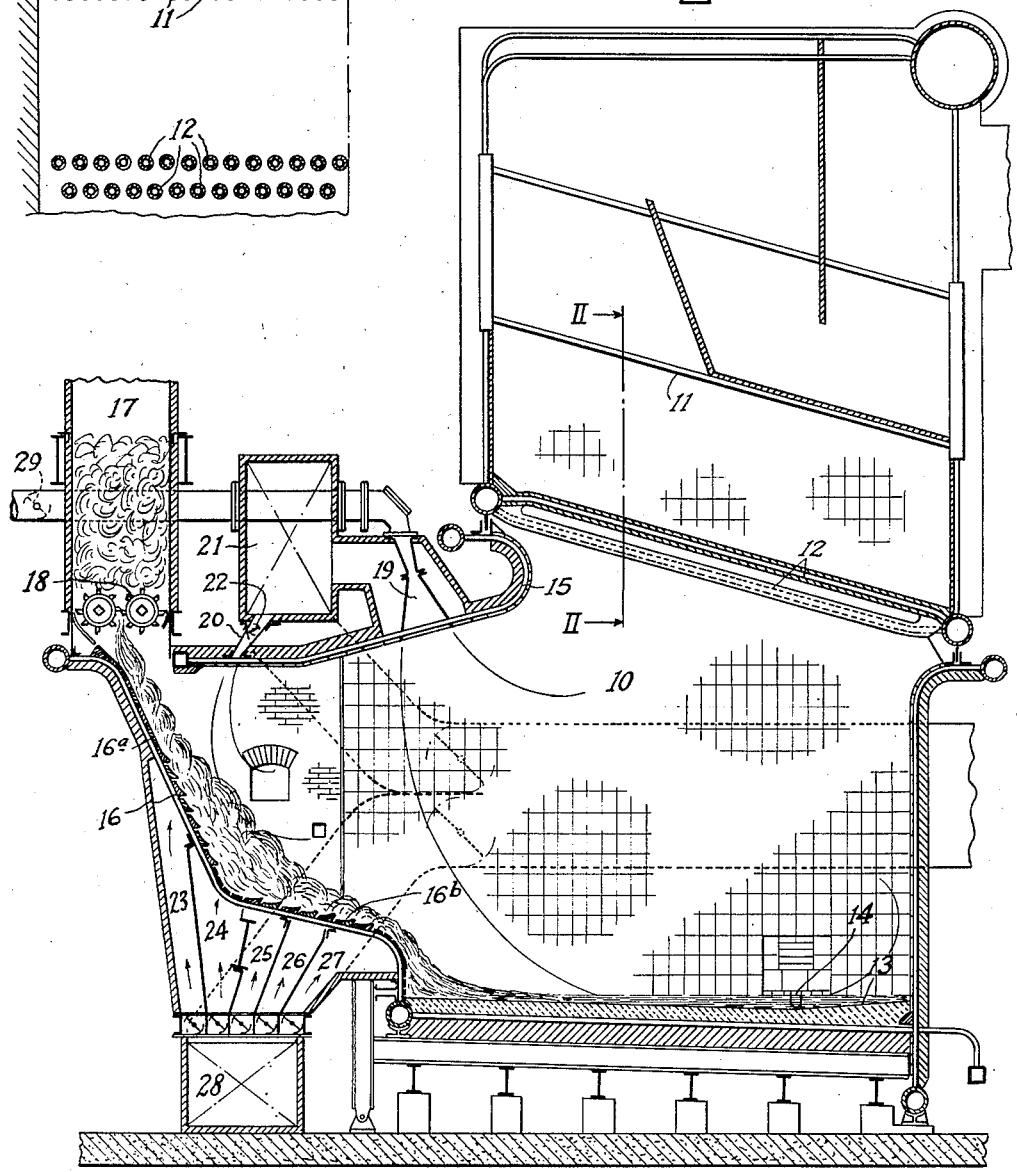
INVENTOR
*Ervin G. Bailey*
BY
ATTORNEY Patented Sept. 18, 1934

1,973,697

UNITED STATES PATENT OFFICE 1,973,697

HIGH TEMPERATURE INCINERATOR FURNACE

Ervin G. Bailey, Easton, Pa., assignor to The Babcock & Wilcox Company, Newark, N. J., a corporation of New Jersey Application October 15, 1932, Serial No. 637,905

14 Claims. (Cl. 110—10)

My invention relates to a high temperature incinerator furnace and more particularly to such a furnace which is especially adapted to incinerate refuse, recover heat from the products of combustion of said refuse and to prepare the residue in a form for easy handling. The invention is especially useful in cases where it is desired to incinerate refuse and at the same time generate steam in a boiler above the furnace.

One object of the invention is the provision of a furnace wherein moist refuse, garbage, rubbish, sewage sludge, etc. may be incinerated or disposed of in effective manner. Another object is the provision of such a construction wherein the heat of a boiler furnace may be employed for refuse incineration. Another object is the elimination of obnoxious odors resulting from refuse incineration. Still a further object is the provision of such a furnace wherein the incombustible elements of the refuse will be converted into a form which is clean, compact and easily handled for final disposition. Other objects will appear from consideration of the present specification.

In the past many attempts have been made to dispose satisfactorily of the refuse ordinarily collected on city streets which refuse is of a wide range of character. This refuse consists ordinarily of a large variety of substances including combustibles, wet materials, bulky materials, metals, and refractory articles such as bottles, etc. I have found that this material may be conveniently disposed of in a high temperature furnace of special construction above which steam may be generated and that preliminary preparation and sorting may be made unnecessary by means of this construction.

In order to accomplish the desired results I construct a furnace having a high temperature zone for the combustion of fuel having a high heat value. I further provide a preliminary drying or combustion zone for the refuse which is to be fed into the furnace. Finally, I provide a secondary combustion zone wherein the gases formed in the two zones just described are remixed by the action of a hot refractory covered screen of tubes. The preliminary drying or combustion zone for the refuse is heated by radiant heat from the high temperature zone which is of large size in comparison with the preliminary drying or combustion zone, and which is kept at a very high temperature by means of the burning fuel of high heat value.

Because of the large size of the high temperature zone with relation to the preliminary drying or combustion zone, the temperature of the entire furnace is easily maintained at a substantially constant value regardless of the feed or quality of refuse. Adjustments in temperature when necessary may be made by adjusting the rate of fuel feed.

The invention is shown by way of illustration in the accompanying drawing wherein—

Figure 1 is a vertical section through a boiler and furnace constructed in accordance with the invention, and Fig. 2 is a transverse section of part of the furnace illustrated in Figure 1 taken on the line II—II of Figure 1.

In the drawing there is shown a furnace 10 above which there is a boiler 11 having dust screen tubes 12 below it. The dust screen tubes are preferably covered with a refractory coating in order to maintain the temperature of their outside surfaces at a high value and thus to increase the pick-up of molten particles from the gases passing through them. A slag tap floor 13 is provided in the bottom of the furnace and a slag tap opening 14 adjacent a low point in the floor 13 permits removal of slag which has collected on the floor 13. A roof 15 has a portion thereof above the slag tap floor or bottom 13 of the furnace, and a sloping surface 16 extends from the roof 15 toward the slag tap bottom 13. The sloping surface 16 has different inclinations, here illustrated as two portions 16$^a$ and 16$^b$. The sloping surface 16 is preferably water cooled in order to maintain its temperature at a point where the wet material will not be suddenly heated causing it to adhere to the refractory surface thereof.

Means is provided for feeding refuse to the sloping surface 16 at its upper end, that is to say, the upper end of the portion 16$^a$. This means is illustrated as a chute 17 above the high end of the portion 16$^a$. A pair of masticating rolls 18 is provided at the lower end of the chute 17 to break up any large units in the refuse, such as crates, baskets, etc. The masticated refuse passes downwardly to the upper part of the portion 16$^a$ of the sloping surface 16.

The upper portion 16$^a$ is so inclined that the wet residue will flow of its own weight down its surface. As it flows down it is dried by radiation from the furnace 10 and by air which is brought to it, as will be subsequently described. Accordingly the wet material loses weight and becomes concentrated as it passes downwardly of the upper portion 16$^a$ of the sloping surface 16. In concentrated form this material comes upon the portion 16$^b$ which has a more gentle slope. Here the material is completely burned and the incombustible residue is melted, more time being allowed for the material to absorb heat directly from the burning fuel. The melted residue then flows over the end of the portion 16$^b$ to the floor 13 of the furnace where it remains in molten form.

Means is provided for projecting the fuel of high heat value in fluid form, for instance, as pulverized coal, into the furnace through the roof 15 toward the slag tap bottom 13. This means is here illustrated as a pulverized coal burner 19. Secondary air is preferably fed into the furnace adjacent the burner 19. Means is also provided for projecting secondary air through the roof 15 toward the sloping surface 16, this means being illustrated as a nozzle 20 fed from a secondary air-box 21 and controlled by a damper 22. The secondary air is preferably preheated in well known manner.

Means is further provided for projecting additional secondary air through the sloping surface 16 into the refuse thereon. This means comprises a series of ducts 23, 24, 25, 26, and 27, each controlled by a damper and fed from a common secondary air-box 28 which preferably carries preheated air. Openings leading from the ducts 23, 24, etc. into the furnace are provided between the tile forming the inclined surface 16.

While it is found desirable to water cool the walls of the high temperature zone it is preferred not to cool the side walls of the preliminary drying or combustion zone to the same extent, in order more effectively to utilize the heat radiated thereto for the drying and combustion of the refuse. These side walls are accordingly indicated in Figure 1 as simple brick walls.

In operation the furnace functions as follows:

The fuel stream projected by the burner 19 enters the furnace through the roof 15, passes downwardly toward the slag tap bottom 13 burning as it goes, reverses its direction and passes upwardly through the slag screen tubes 12 to the boiler 11. During the passage through the furnace of the fuel stream any ash or incombustible solid therein is melted by the heat of the flame and is precipitated to the furnace floor 13 in molten form. Refuse is fed to the chute 17 whence it passes the masticating rolls 18 where it is broken up and is deposited upon the upper portion 16$^a$ of the sloping surface 16, down which it slides. While passing over the sliding surface 16 the refuse is heated by radiation from the burning fuel stream, comes in contact with a stream of secondary air projected by the air nozzle 20 upon it and receives in its interior a quantity of air from the ducts 23, 24, etc. Thus, the refuse is first dried and then burned, coming finally upon the portion 16$^b$ of the sloping surface 16 where its final combustion takes place and where the incombustible parts thereof are melted and flow downwardly to the furnace floor 13. On the floor 13 the melted incombustible parts of the refuse and the ash and other incombustible constituents of the fuel are commingled and fused together and form a molten residue of uniform condition which may be tapped from the furnace at intervals.

The moisture and gases which are liberated from the refuse mingle with the products of combustion with which they are thoroughly mixed by the slag screen tubes 12. The gases are accordingly thoroughly mixed and combustion is substantially completed before the gases strike the boiler tubes.

The present invention disposes very effectively of the odor problem which must always be considered in the incineration of refuse. As has been pointed out, the furnace proper is of large size as compared to the refuse incinerating part thereof. By bringing the refuse quickly into proximity with a large volume of rapidly burning fuel and by elevating its temperature rapidly to a high degree, say 1100 to 1200° F., organic matter is broken down and all odor is destroyed. Furthermore, complete combustion of the combustible matter in the refuse is assured both by the relative sizes of the high temperature zone and the preliminary drying or combustion zone and by the action of the refractory covered slag screen tubes 12.

The emission of obnoxious gases from known types of incinerators frequently results from lowering the incinerator temperature by the addition of large quantities of moist refuse. Such action is here prevented by a relatively large volume of furnace space which is devoted to the combustion of fuel having a high heat value, also by the thorough commingling of air with the refuse at an early stage of its treatment, and finally by the mixing action of the screen tubes 12. Furthermore, it is possible to regulate the amount of heat supplied to the furnace in accordance with the amount of refuse fed thereto, by any convenient means, here conventionally illustrated as the valve 29 in the fluid fuel line.

The removal of the incombustible parts of the refuse (for instance, bottles, etc.) in the form of a fluid slag makes its disposal a comparatively simple problem.

The invention is not confined to the particular construction here illustrated and described for purposes of example. For instance, the products of combustion may be used for other purposes than that of generating steam. Clearly, other forms of the invention than those here illustrated and described which nevertheless come within the scope of the appended claims will suggest themselves to those dealing with the problem of refuse incineration.

With this understanding, I claim:

1. In a furnace, a slag tap bottom, a roof having a portion thereof above said slag tap bottom, and a sloping surface extending from said roof toward said slag tap bottom, in combination with means for feeding refuse to said sloping surface, and means for projecting pulverized fuel through said roof toward said slag tap bottom.

2. In a furnace, a slag tap bottom, a roof having a portion thereof above said slag tap bottom, and a sloping surface extending from said roof toward said slag tap bottom, in combination with means for feeding refuse to said sloping surface, means for projecting pulverized fuel through said roof toward said slag tap bottom, and means for projecting secondary air toward said sloping surface.

3. In a furnace, a slag tap bottom, a roof having a portion thereof above said slag tap bottom, and a sloping surface extending from said roof toward said slag tap bottom at different inclinations, in combination with means for passing secondary air through said sloping surface into said furnace.

4. In a furnace, a slag tap bottom, a roof having a portion thereof above said slag tap bottom, and a sloping surface extending from said roof toward said slag tap bottom at different inclinations, in combination with means for feeding refuse to said sloping surface, means for projecting pulverized fuel through said roof toward said slag tap bottom, and means for passing secondary air through said sloping surface into said furnace.

5. In a furnace, a slag tap bottom, a roof having a portion thereof above said slag tap bottom, and a sloping surface extending from said roof toward said slag tap bottom at different inclinations, in combination with means for feeding refuse to said sloping surface, means for projecting pulverized fuel through said roof toward said slag tap bottom, means for projecting a stream of secondary air through said roof toward said sloping surface between said pulverized fuel projecting means and said sloping surface, and means for passing secondary air through said sloping surface into said furnace.

6. In a furnace, a slag tap bottom, a roof having a portion thereof above said slag tap bottom, and a sloping surface extending from said roof toward said slag tap bottom at different inclinations, in combination with masticating rolls for feeding refuse to said sloping surface, means for projecting pulverized fuel through said roof toward said slag tap bottom and means for projecting a stream of secondary air toward said sloping surface.

7. In a furnace, a slag tap bottom, a roof having a portion thereof above said slag tap bottom, and a sloping surface extending from said roof toward said slag tap bottom at different inclinations, in combination with masticating rolls for feeding refuse to said sloping surface, means for projecting pulverized fuel through said roof toward said slag tap bottom, means for projecting a stream of secondary air through said roof toward said sloping surface between said pulverized fuel projecting means and said sloping surface, and means for passing secondary air through said sloping surface into said furnace, substantially as described.

8. The method of incinerating refuse which comprises burning a stream of high heat value fuel in suspension in a combustion zone, passing a stream of refuse to be incinerated through an adjacent drying and burning zone receiving heat by radiation from said combustion zone, supplying air in intimate contact with the refuse in said drying and burning zone, supplying additional air for combustion to a space between the surface of the refuse and the stream of burning fuel to facilitate the drying and burning of the refuse and the melting of the incombustible refuse residue, mixing the gases from the burning refuse with the stream of burning fuel to complete combustion thereof and minimize odors in the products of combustion, collecting and maintaining the molten residue in a pool in the bottom of said combustion zone, and intermittently tapping the molten residue from the pool.

9. The method of incinerating refuse which comprises burning a stream of high heat value fuel in suspension in a combustion zone, continuously passing a stream of refuse to be incinerated by gravity through an adjacent drying and burning zone receiving heat by radiation from the stream of burning fuel in said combustion zone, supplying air in regulated quantities through different portions of and in intimate contact with the refuse in said drying and burning zone, supplying additional air for combustion to a space between the surface of the stream of refuse and the stream of burning fuel to facilitate the drying and burning of the refuse and the melting of the incombustible refuse residue, mixing the gases from the burning refuse with the stream of burning fuel to complete combustion thereof and minimize odors in the products of combustion, collecting and maintaining the molten residue in a pool in the bottom of said combustion zone, and intermittently tapping the molten residue from the pool.

10. The method of incinerating refuse which comprises projecting a stream of high heat value slag-forming fuel downwardly in and burning it in suspension in a combustion zone, passing a stream of refuse to be incinerated by gravity substantially parallel to said fuel stream through an adjacent inclined drying and burning zone receiving heat by radiation from said combustion zone, supplying air for combustion to a space between the surface of the stream of refuse and the stream of burning fuel to facilitate the drying and burning of the refuse and the melting of the incombustible refuse residue, mixing the gases from the burning refuse with the stream of burning fuel to complete combustion thereof and minimize odors in the products of combustion, collecting and maintaining the molten residue of said refuse and slag separated from said burning fuel in a pool in the bottom of said combustion zone, and intermittently tapping the molten residue from the pool.

11. The method of incinerating refuse which comprises projecting a stream of high heat value slag-forming fuel downwardly in a U-shaped flow path and burning it in suspension in a combustion zone, passing a stream of refuse to be incinerated by gravity substantially parallel to said fuel stream through an adjacent inclined drying and burning zone receiving heat by radiation from the stream of burning fuel in said combustion zone, supplying air in regulated quantities through different portions of and in intimate contact with the refuse in said drying and burning zone, supplying additional air for combustion to a space between the surface of the stream of refuse and the stream of burning fuel to facilitate the drying and burning of the refuse and the melting of the incombustible refuse residue, mixing the gases from the burning refuse with the stream of burning fuel to complete combustion thereof and minimize odors in the products of combustion, collecting and maintaining the molten residue of said refuse and slag separated from said burning fuel in a pool in the bottom of said combustion zone, and intermittently tapping the molten residue from the pool.

12. A refuse incinerator comprising a combustion chamber, means for burning a stream of high heat value fuel in suspension in said combustion chamber, an adjacent inclined surface arranged to receive heat by radiation from said combustion chamber, means for delivering refuse to be incinerated to the upper end of said inclined surface, means for supplying air through and in intimate contact with the stream of refuse on said surface, means for supplying additional air for combustion to a space between the surface of the stream of refuse and the stream of burning fuel to facilitate the drying and burning of the refuse and the melting of the incombustible refuse residue, the bottom of said combustion chamber being arranged to collect and maintain a pool of molten residue of said refuse, and a slag tap opening for intermittently tapping the molten residue from the pool.

13. A refuse incinerator comprising a combustion chamber, means for burning a stream of high heat value fuel in suspension in said combustion chamber, an adjacent inclined surface arranged to receive heat by radiation from said combustion chamber, means for delivering refuse to be incinerated to the upper end of said inclined surface, means for supplying air through and in intimate contact with the stream of refuse on said surface, means for supplying additional air for combustion to a space between the surface of the stream of refuse and the stream of burning fuel to facilitate the drying and burning of the refuse and the melting of the incombustible refuse residue, the bottom of said combustion chamber being arranged to collect and maintain a pool of molten residue of said refuse, a slag tap opening for intermittently tapping the molten residue from the pool, a gas outlet from said combustion chamber at the opposite side of said fuel stream from said surface, and a series of gas mixing tubes extending across said gas outlet.

14. A refuse incinerator comprising a combustion chamber, means for discharging a stream of high heat value slag-forming fuel downwardly in a U-shaped flow path and burning it in suspension in said combustion chamber, an adjacent inclined surface arranged to receive heat by radiation from the burning fuel in said combustion chamber, means for delivering refuse to be incinerated to the upper end of said inclined surface, means for supplying air in regulated quantities through different portions of and in intimate contact with the stream of refuse on said surface, means for supplying additional air for combustion to a space between the surface of the stream of refuse and the stream of burning fuel to facilitate the drying and burning of the refuse and the melting of the incombustible refuse residue, the bottom of said combustion chamber being arranged to collect and maintain a pool of molten residue of said refuse and slag separated from the burning fuel, a slag tap opening for intermittently tapping the molten residue from the pool, a gas outlet from said combustion chamber at the opposite side of said fuel stream from said surface, and a series of gas mixing tubes extending across said gas outlet.

ERVIN G. BAILEY.